United States Patent [19]

Burton

[11] 4,134,251
[45] Jan. 16, 1979

[54] HARVESTER FOR GRAPES OR THE LIKE WITH IMPROVED COLLECTOR LEAF CONSTRUCTION

[75] Inventor: Charles G. Burton, Lewiston, N.Y.

[73] Assignee: Chisholm-Ryder Company, Inc., Niagara Falls, N.Y.

[21] Appl. No.: 703,181

[22] Filed: Jul. 7, 1976

Related U.S. Application Data

[63] Continuation-in-part of Ser. No. 654,634, Feb. 2, 1976, abandoned.

[51] Int. Cl.$^2$ .......................................... A01D 46/00
[52] U.S. Cl. ................................................ 56/330
[58] Field of Search ............... 56/14.3, 330, 30, 40–50

[56] References Cited

U.S. PATENT DOCUMENTS

| 2,648,942 | 8/1953 | Grant et al. | 56/14.3 |
| 3,184,908 | 5/1965 | Rust | 56/330 |
| 3,225,894 | 12/1965 | Weygandt et al. | 56/330 X |
| 3,255,578 | 6/1966 | Pertics | 56/330 |
| 3,385,042 | 5/1968 | Christie et al. | 56/330 |
| 3,538,694 | 11/1970 | Holloway | 56/330 |

Primary Examiner—Russell R. Kinsey
Attorney, Agent, or Firm—Joseph P. Gastel

[57] ABSTRACT

A harvester for harvesting produce from plants such as grapevines or the like including a frame and produce harvesting members on the frame, a plurality of collector leaves mounted on the frame proximate the ground for defining a surface for catching produce harvested from the plants, and produce-lifting portions on the foremost produce-collecting leaves, said produce-lifting portions having downwardly and forwardly inclined surfaces for lifting low-growing produce onto the collector leaves. A lifting collector leaf for a harvesting machine including a first substantially horizontal planar portion and a second portion which extends forwardly and downwardly from the first portion.

36 Claims, 22 Drawing Figures

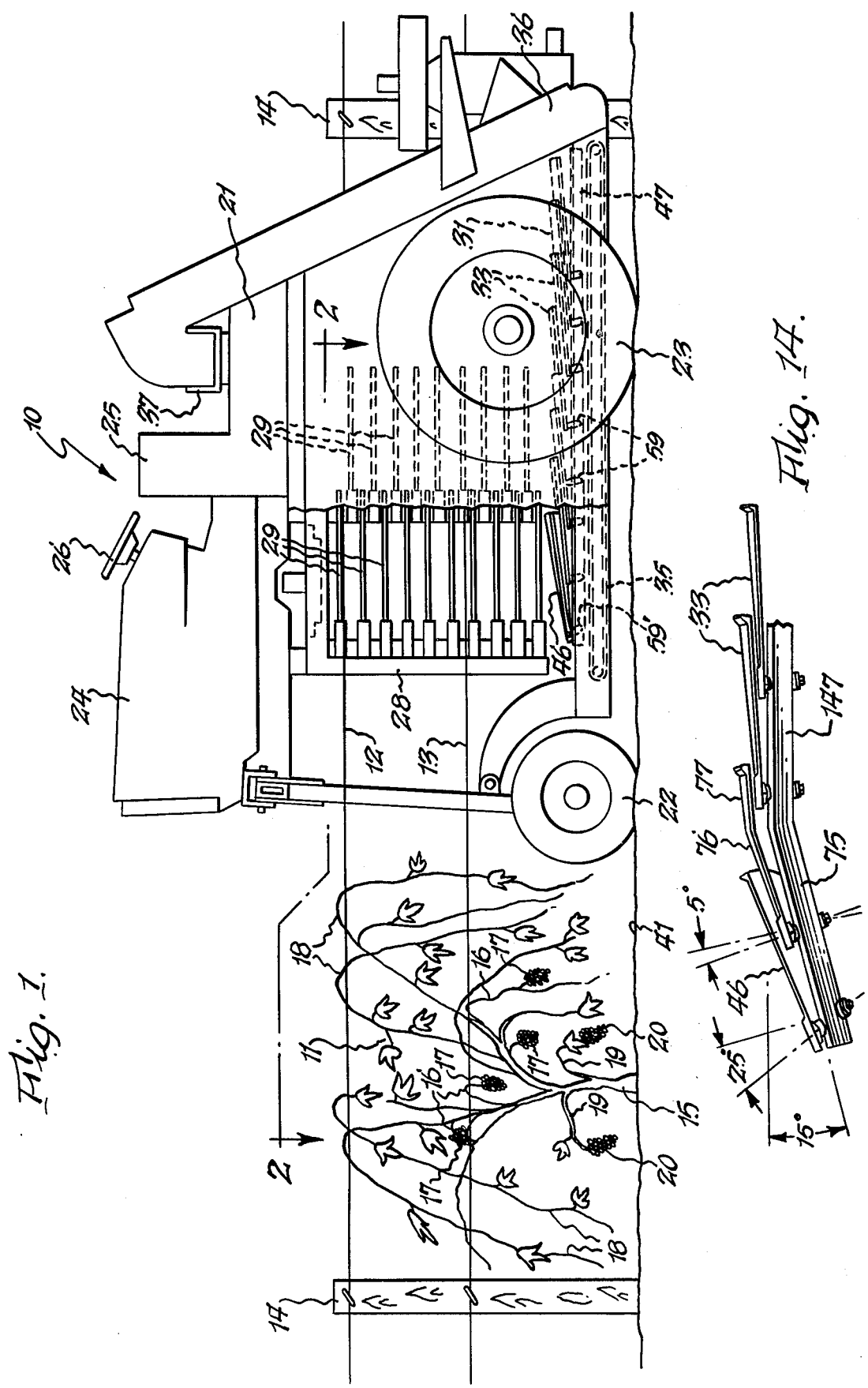

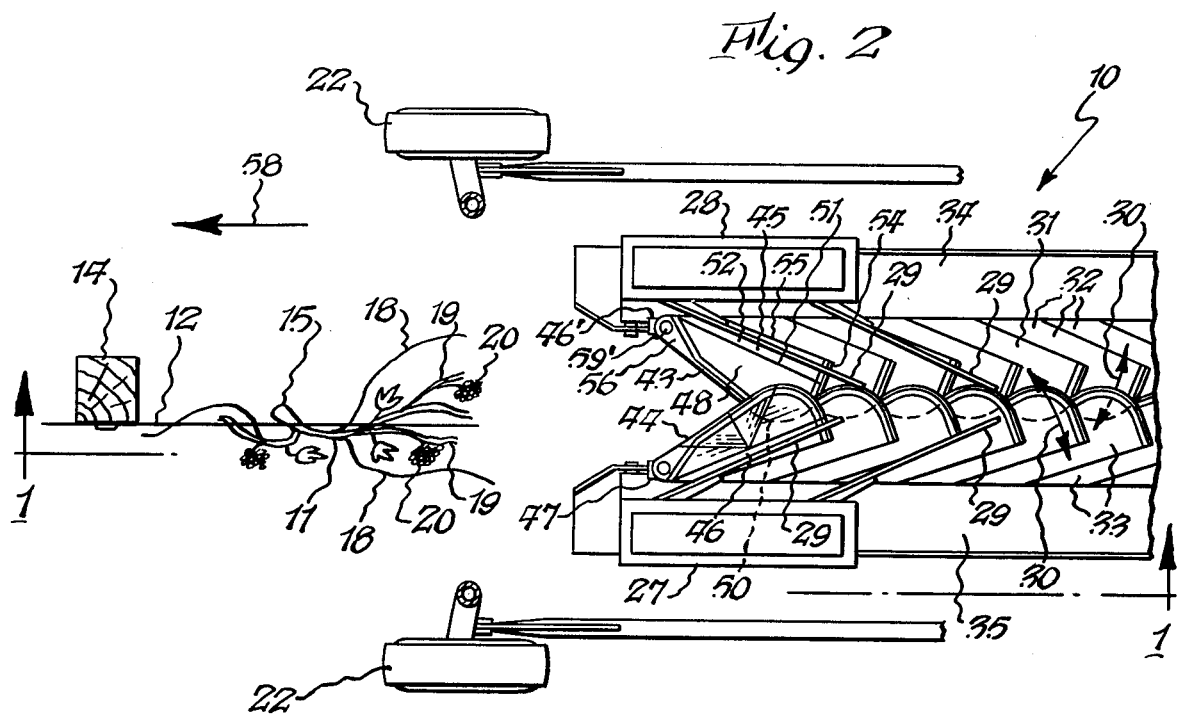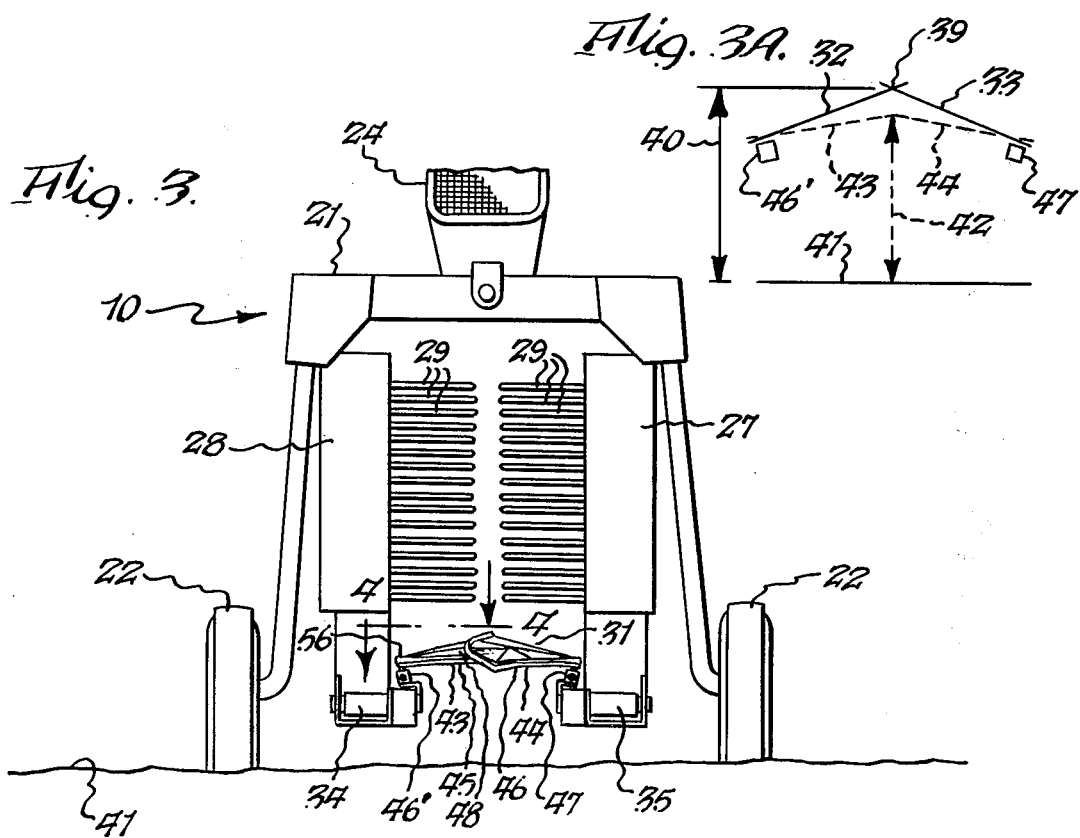

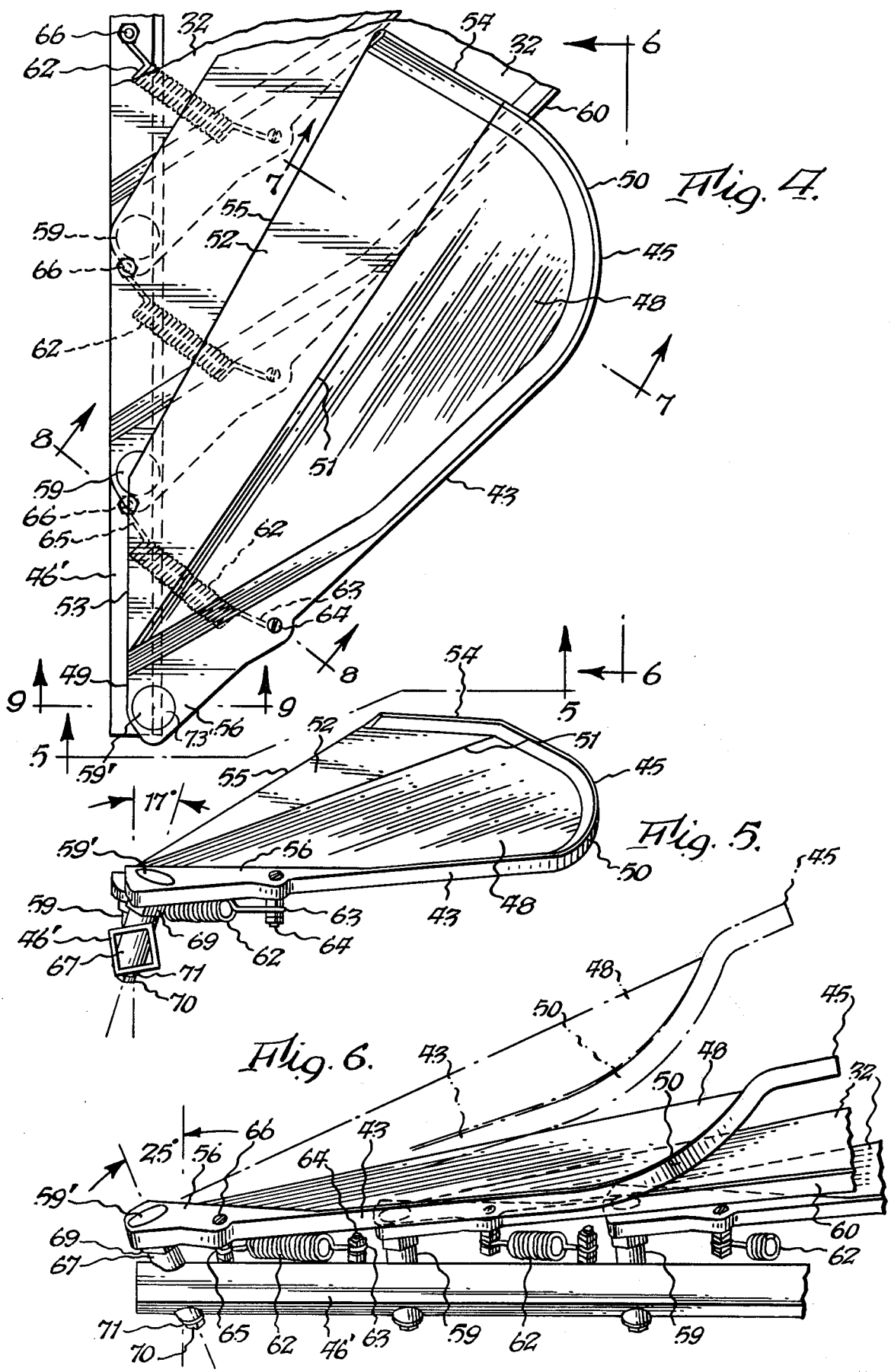

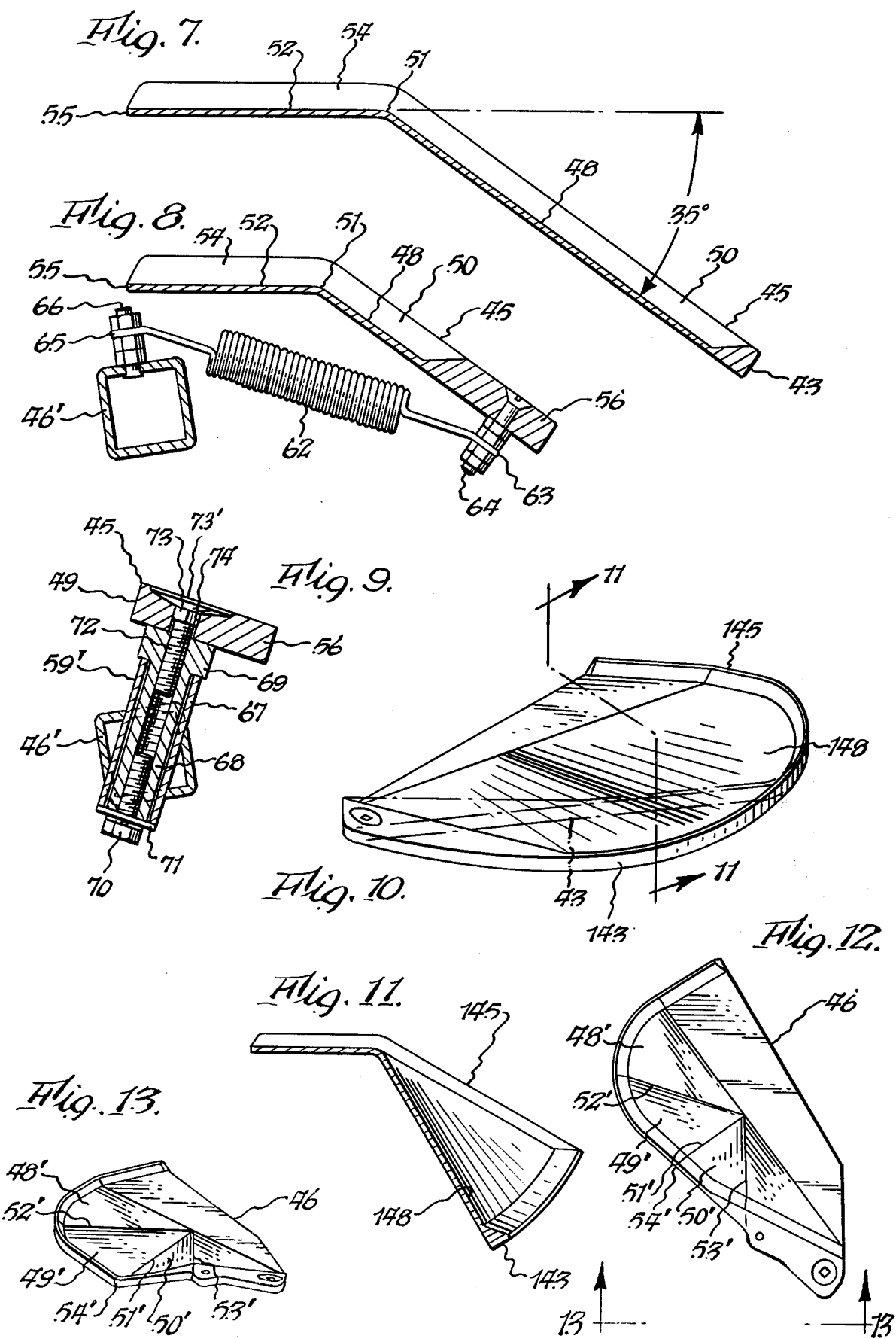

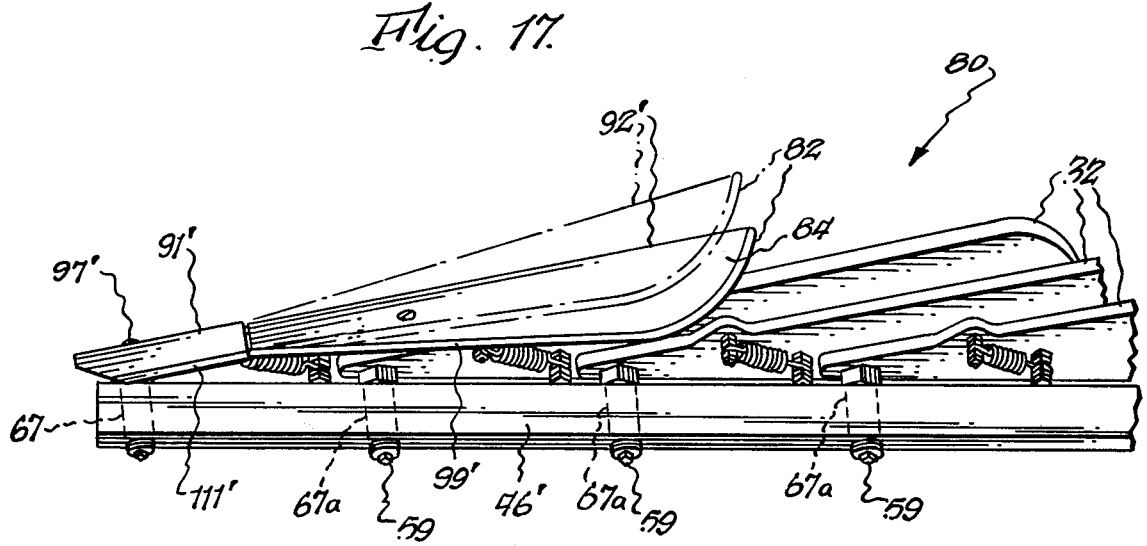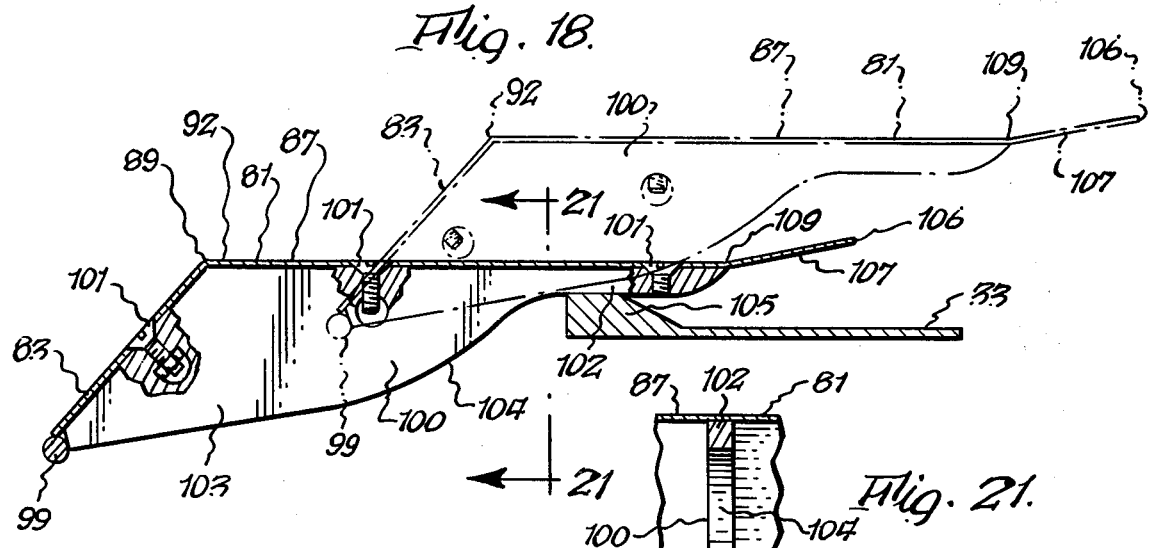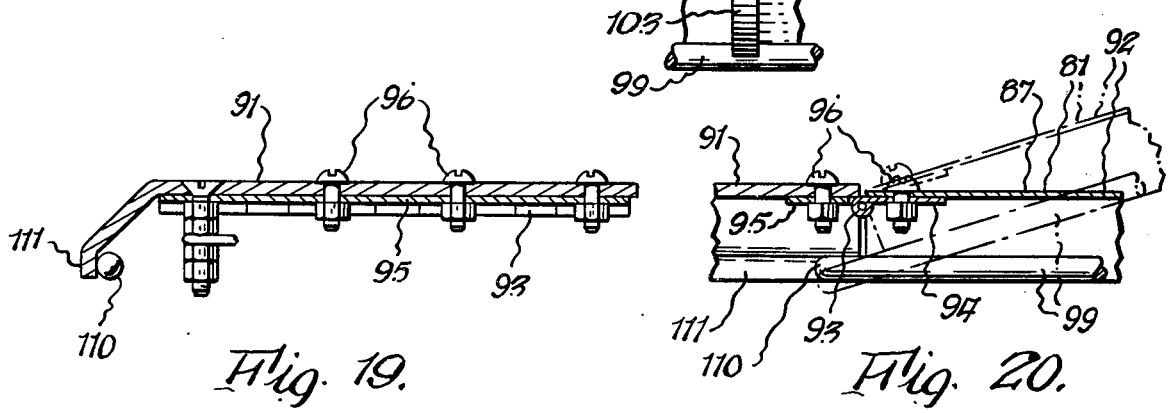

4,134,251

HARVESTER FOR GRAPES OR THE LIKE WITH IMPROVED COLLECTOR LEAF CONSTRUCTION

The present application is a continuation-in-part of application Ser. No. 654,634, now abandoned, filed Feb. 2, 1976.

The present invention relates to a harvester for harvesting produce from plants such as grapevines and more particularly to an improved collector leaf construction therefor.

By way of background, in certain types of grape harvesters, a collector leaf construction is provided onto which the harvested grapes fall. The collector leaves direct the harvested grapes to conveyor belts which transport them to a desired area on the harvester. The collector leaves are pivotally mounted near the bottom of the grape harvester so as to permit them to yield when they encounter obstructions, such as grapevine supporting posts, and after such obstructions have been passed, they return to a normal position wherein they provide a bed for receiving harvested grapes. The collector leaves are so mounted relative to each other so that they can pivot independently of each other. In the past, the collector leaves were located a predetermined distance above the ground because the construction of the harvesting machine dictated a certain minimum distance. Therefore, any grapes growing on vine portions which were below the specified minimum distance would pass underneath the collector leaves and therefore would not be harvested. This constituted a significant percentage of the total grapes and therefore the fact that they were not harvested constituted an economic loss. It is with overcoming the foregoing deficiency of the prior art that the present invention is concerned.

It is accordingly one important object of the present invention to provide a harvester having an improved collector leaf construction which is capable of lifting low growing produce up onto the normal produce collecting surface, thereby effectively harvesting produce which heretofore passed below the normal collector leaves and was not harvested.

Another object of the present invention is to provide an improved collector leaf construction for a harvester which will effect the harvesting of produce which was heretofore too low to be harvested. Other objects and attendant advantages of the present invention will readily be perceived hereafter.

The present invention relates to a harvester, and more particularly to a harvester for harvesting produce such as grapes from grapevine plants comprising a frame, harvesting means on the frame, collector leaf means on the frame for defining a surface for catching produce which was harvested by said harvesting means, and produce lifting collector leaf means below said surface for lifting produce which would normally pass below said surface up onto said surface.

The present invention also relates to a lifting collector leaf for a harvesting machine comprising a first substantially planar portion, a second portion connected to said first portion and extending forwardly and downwardly therefrom, and means for mounting said lifting collector leaf on a harvesting machine.

While the present invention is being specifically described relative to a grape harvester having improved collector leaf means, it will be appreciated that the harvester may also have utility in other types of harvesting.

The various aspects of the present invention will be more fully understood when the following portions of the specifications are read in conjunction with the accompanying drawings wherein:

FIG. 1 is a partially broken-away side elevational view taken along line 1—1 of FIG. 2 and showing the improved collector leaf construction on a grape harvester which is oriented relative to a single curtain grapevine formation;

FIG. 2 is a fragmentary view partially in cross section taken substantially along line 2—2 of FIG. 1;

FIG. 3 is a fragmentary elevational view of the harvester taken from the left of FIG. 1;

FIG. 3A is a schematic view showing how the improved lifting collector leaf is closer to the ground than conventional leaves heretofore used;

FIG. 4 is a fragmentary plan view of a collector leaf assembly taken on line 4'4 of FIG. 3 and showing the conventional collector leaves and the foremost lifting collector leaf;

FIG. 5 is a front elevational view of the lifting collector leaf taken substantially in the direction of line 5—5 of FIG. 4;

FIG. 6 is a fragmentary view taken substantially along line 6—6 of FIG. 4;

FIG. 7 is a cross sectional view taken substantially along line 7—7 of FIG. 4 and showing the configuration of the lifting collector leaf in this area;

FIG. 8 is a cross sectional view taken substantially along line 8—8 of FIG. 4 and showing the configuration of the collector leaf in this area;

FIG. 9 is a cross sectional view taken substantially along line 9—9 of FIG. 4 and showing the pivotal mounting construction for the collector leaf;

FIG. 10 is a view similar to FIG. 5 but showing a modified lifting collector leaf having a downwardly extending arcuate leading edge;

FIG. 11 is a cross sectional view taken substantially along line 11—11 of FIG. 10;

FIG. 12 is a view similar to FIG. 4 but showing the configuration of another embodiment of the lifting collector leaf which overlies the adjacent collector leaf;

FIG. 13 is a view taken substantially along line 13—13 of FIG. 12;

FIG. 14 is a fragmentary side elevational view showing a further modified form of lifting collector leaf construction;

FIG. 17 is a side elevational view taken substantially along line 17—17 of FIG. 15 and showing the relationship between the lifting collector leaf and the adjacent collector leaf;

FIG. 18 is a fragmentary cross sectional view taken substantially along line 18—18 of FIG. 15 and showing primarily the cam attached to the underside of the lifting collector leaf and also showing the surface on the adjacent collector leaf on which the cam rides;

FIG. 19 is a fragmentary cross sectional view taken substantially along line 19—19 of FIG. 15 and showing the cross sectional configuration of the inboard portion of the lifting collector leaf;

FIG. 20 is a fragmentary cross sectional view taken substantially along line 20—20 of FIG. 15 and showing the hinge structure between the inboard and outboard lifting collector leaf portions; and FIG. 21 is a fragmentary cross sectional view taken substantially along line 21—21 of FIG. 18.

Figure 15:
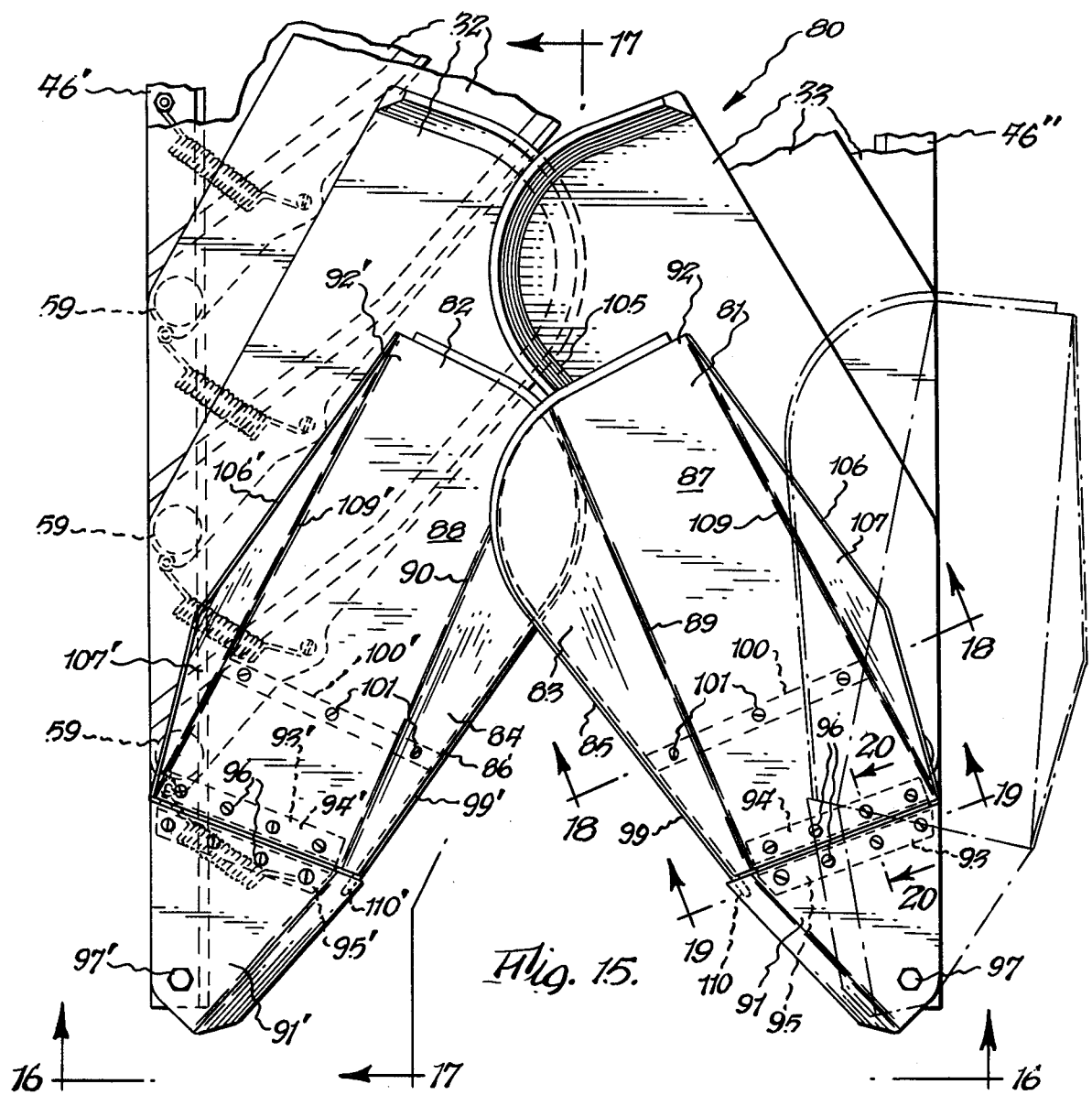
FIG. 15 is a fragmentary plan view of a preferred configuration of lifting collector leaves mounted in operative relationship to each other and to adjacent collector leaves.

The harvester 10 of the present invention is shown in FIGS. 1 and 2 in relation to a single curtain vine formation wherein the grapevines 11 are grown on wires 12 and 13 which are strung between spaced posts 14. Each grapevine includes a main trunk 15, the grape-bearing portions 16 which carry clumps of grapes 17, the cane portions 18, and the grape-bearing low cane portions 19 which carry clumps of grapes 20. The grape-bearing portions 16 lie substantially along the wall defined by wires 12 and 13. The cane 18 is located on opposite sides of the foregoing wall in obscuring relationship to the grape-bearing portions 16, and may be lifted out of the way by structure fully described in my copending application Ser. No. 643,504, filed Dec. 22, 1975, so that the harvesting means may have access to grape-bearing portions 16.

The grapes 20, which grow on the low cane portions 19, have not been harvested in the past because they pass underneath all parts of the harvester which could remove such grapes. In this respect, the collector leaves, which will be described in detail hereafter, have been spaced about 14 inches from the ground and any grapes on vines below 14 inches, passed under the collector leaves and were not harvested. The improved collector leaf construction of the present invention permits certain of these heretofore non-harvested grapes to be harvested.

Broadly, harvester 10 includes an inverted U-shaped frame 21 mounting a pair of front wheels 22 and a pair of rear wheels 23. The harvester is driven by an engine 24 mounted on the top of frame 21, and the operator sits in seat 25 and steers the harvester in straddling relationship to a row of grapevines by manipulating steering wheel 26, which is suitably coupled to front wheels 22 through an appropriate linkage. Suitably mounted on frame 21 are spaced modules 27 and 28 which carry vine beater rods 29 which extend rearwardly. Suitable drive mechanism (not shown) which is well known, drives arms 29 in an oscillating manner in the direction of arrows 20. Arms 29 may be of any suitable construction and instead of being cylindrical rods as shown, may comprise broad paddles with fingers at the outer ends thereof. The exact configuration of the arms will depend on the specific grapes which are being harvested. Furthermore, arms 29 may oscillate in any desired manner which is well known in the art.

As is well understood, as harvester 10 moves along the row of grapevines, the vines will be beaten by arms 29 and cause the grapes to fall on a bed 31 formed by catcher or collector leaves 32 and 33 at the bottom of the harvester. These collector leaves 32 and 33 extend substantially from the front of the harvester 10 to the rear thereof and they retract when they engage post 14 as is well understood. The upper surfaces of collector leaves 32 are inclined downwardly to the left at an angle of about 10° and the upper surfaces of collector leaves 33 are inclined downwardly to the right at an angle of about 10°, as schematically shown in FIG. 3A. Because of this slope, grapes which fall onto the upper surfaces of leaves 32 and 33, will slide downwardly onto conveyor belts 34 and 35, respectively. These conveyors 34 and 35 move the grapes rearwardly to elevator conveyors 36 at the rear of the harvester from which they pass onto a delivery conveyor 37 which drops the grapes into containers mounted on the truck which travels in parallel relationship with harvester 10 along the row of grapevines.

As mentioned briefly above, certain of the grapes, such as 20, are positioned below collector leaves 32 and 33. In this respect, as can be seen from FIG. 3A, apex 39 of leaves 32 and 33 is a predetermined distance 40 above ground level 41. This distance is generally about 14 inches. Therefore, any grapes located below leaves 32 and 33 will pass below them and not be harvested. However, in accordance with the present invention, the level of apex 39 is effectively reduced to distance 42 which is approximately 4 inches lower than the 14 inch distance 40. This constitutes an approximate 28% lowering at the apex and a corresponding lowering along the front edges 43 and 44 of the foremost lifting collector leaves 45 and 46, respectively, which will engage a certain percentage of the grapes, which heretofore passed underneath the collector leaves, and will lift such grapes up onto collector leaves 32 and 33. This results in an increase in the amount of grapes which is harvested.

At this point it is to be noted that collector leaves 32 and 33 are mirror images of each other. Lifting collector leaf 46 is a modified form of lifting collector leaf 45. Therefore, for the sake of brevity, only collector leaves 32, 45 and 46 will be described. Collector leaves 32 and 45 are pivotally mounted on elongated box section 46' and leaves 33 and 46 are pivotally mounted on box section 47 which is located in mirror image relationship to box section 46'. Box sections 46' and 47 are suitably mounted on the frame of the harvester. As viewed from FIG. 2, the collector leaves mounted on box section 46' pivot in a counterclockwise direction from their normal position shown and leaves 33 and 46 pivot in a clockwise direction from their normal position shown.

The improved lifting collector leaf 45 includes a downwardly and forwardly inclined frontal portion 48 which is disposed at a steeper angle to the horizontal than collector leaves 32. Frontal portion 48 extends between leading edge 43, side edge 49, rounded outer edge 50, and straight line junction 51 which is located between planar portion 48 and planar portion 52. Planar portion 52 is bounded by junction line 51, edge portion 53, edge portion 54, and trailing edge 55. In more specific detail, it can be seen that edge portions 43, 50 and 54 are of increased cross section relative to planar portions 48 and 52 to provide the desired rigidity. In addition, edge portion 43 merges into mounting portion 56 which is of increased cross sectional configuration FIG. 8) and serves to mount the structure for mounting lifting leaf 45 onto box section 46'.

At this point it is noted that collector leaves 32 are identical in outer configuration in plan to lifting collector leaf 45 except that the portions corresponding to portions 52 and 48 of leaf 45 lie in the same plane. In other words, the only difference between leaves 32 and leaf 45 is that leaves 32 do not have the downwardly and forwardly inclined portion 48 which extends at an angle of about 35° relative to portion 52 (FIG. 7).

As can be seen from FIG. 2, collector leaves 33 and 46 overlap collector leaves 32 and 45 at about the centerline of the harvester 10. As the harvester moves forwardly in the direction of arrow 58, the leaves will pivot about their respective pivots whenever obstructions, such as posts 14, are encountered. This permits the harvester to pass such obstructions while maintaining a substantially closed bed 31 for receiving grapes which drop from the vines. In order for leaves 32 to pivot without interference from adjacent leaves 32, their pivot pin structures 59 are mounted on box section 46' at an angle of about 5° to the vertical. Pivot pin structures 59 are parallel to each other, and when mounted at the foregoing angle, each leaf 32 will pivot upwardly relative to the next adjacent following leaf so that there will be no interference between them. However, this identical mounting will not work for leaf 45 because it will not permit downwardly and forwardly extending planar portion 48 to clear the leading edge 60 of the next adjacent leaf 32. Accordingly, to effect this clearance, the pivot pin construction 59' for leaf 45 is inclined as shown in FIGS. 5 and 6, namely, about 17° to the vertical as viewed from FIG. 5 and about 25° from the vertical as shown in FIG. 6. This orientation permits leaf 45 to swing to the dotted line position in FIG. 6 from its solid line position shown in FIG. 6 and thus the leading edge 43 will clear the leading edge 60 of the next adjacent collector leaf 32. Leaf 45 is biased to the normal position shown in FIG. 2 by a spring 62 which has one end 63 pivotally mounted on pin 64 secured to portion 56 of leaf 45 and the other end 65 pivotally mounted on pin 66 mounted on box section 46'. An identical spring mounting 62 is used for the other leaves 32, 33 and 46. Each spring 62 is a "constant force" spring which causes the leaf with which it is associated to swing at an uniform force regardless of its position.

Collector leaf 46 (FIGS. 3, 12 and 13) differs slightly in construction from lifting collector leaf 45 described in detail above. In this respect, the lifting portion 48' is the same as portion 48 of leaf 45 except that it includes a downwardly cupped portion comprising planar panels 49' and 50' which join at junction 51'. The cupped portion is formed by cutting portion 48 of FIG. 4 along line 51' and thereafter bending portions 49' and 50' downwardly along lines 52' and 53', respectively, and then filling in the space at 51' and joining the free ends of panels 49' and 50'. This will provide a cupped portion having its lowermost portion at point 54'. This will cause the front edge 44 of leaf 46 to be substantially even with the front edge 43 of leaf 45, notwithstanding that leaf 46 overlaps leaf 45, as can be seen from FIGS. 2 and 3.

The pivoting construction 59' is identical to the pivoting constructions 59, except for its different orientation noted above. The pivoting construction 59' includes a cylndical housing 67 welded to box section 46'. A cylindrical shaft portion 68 having an enlarged hexagonal head 69 is received in housing 67 and is held therein by screw 70 which is received in threaded engagement in shaft 68 with washer 71 therebetween. Portion 56 of leaf 45 is attached to hexagonal head 69 by means of screw 72 having a square head portion 73 which fits into a mating square bore 74 in portion 56. Screw 72 also has a large conical head 73' which fits into a mating depression in leaf portion 56. By rotating portion 69, screw 72 is pulled down into position to cause square portions 73 and 74 to mate and also cause conical portion 73' to move into its associated depression. Thereafter, as leaf 45 pivots back and forth, shaft 68 will pivot relative to housing 67.

As noted above, because planar leaf portion 48 extends downwardly a greater distance than the leading edge portions of prior type of collector leaves, such as 32, grapes which were below the bed 31 can now be harvested because they will ride up onto the forwardly and downwardly inclined surfaces 48 and will be carried to the top of leaves 45 and 32 and 46 and 33 where they will be torn from the vines because of their frictional engagement with the tops of the collector leaves or will be stripped from the vines by the harvesting bars 29 which can be adjusted so that the lowermost bars 29 will be only slightly above the uppermost surface of apex 39. By using the lifting collector leaves 45 and 46, an additional percentage of grapes can be harvested which were heretofore left on the vines because the collector leaves were not sufficiently low to be effective.

A modified construction of a lifting collector leaf 145 is shown in FIGS. 10 and 11. This leaf is identical in all respects to leaf 45 described above except that its leading edge 143 and surface 148 are concave upwardly. This can be appreciated when it is compared to the leading edge 43 of leaf 45 shown in dotted lines. Because portion 148 of leaf 145 is concave upwardly it is lower than the corresponding portion 48 of leaf 45. In other words, considering that leaf 45 can extend as much as 4 inches below the point reached by leaves 32, leaf 143 may extend another few inches so that will be at least 6 inches lower than heretofore possible with leaves 32.

In FIG. 14 a further modified form of collector leaf construction is disclosed. This form includes an elongated box section 147, which is analogous to box section 47 which mounts the collector leaves. However, box section 147 includes a forwardly and downwardly inclined portion 75 on which collector leaves 46 and 47 are mounted. Collector leaves 46 and 76 include portions which extend downwardly at a steeper angle to the horizontal than the surfaces of leaves 33. Collector leaf 46 is identical to that shown in FIGS. 12 and 13. Collector leaf 76 is similar to leaves 33 except that its rear portion 77 is bent downwardly as shown. The construction of FIG. 14 also includes an elongated box section 46', such as shown in FIG. 8, which has added thereto a downwardly extending portion parallel to portion 75 shown in FIG. 14. Lifting collector leaf 45 is mounted opposite lifting collector leaf 46 and a collector leaf, which is the mirror image of leaf 76, is mounted in mirror image relationship thereto on elongated box section 46'. The lifting construction shown in FIG. 14 will have its forwardmost end approximately at the level of the lower run of conveyor 35. If desired, it can even be lower. The collector leaves mounted on portion 75 and its analogous parallel portion will move under the low hanging clumps of grapes, and, as the harvester moves to the left, these clumps will be lifted up onto the remainder of the collector leaves 32 and 33 from which they will be harvested as described above.

Figure 16:
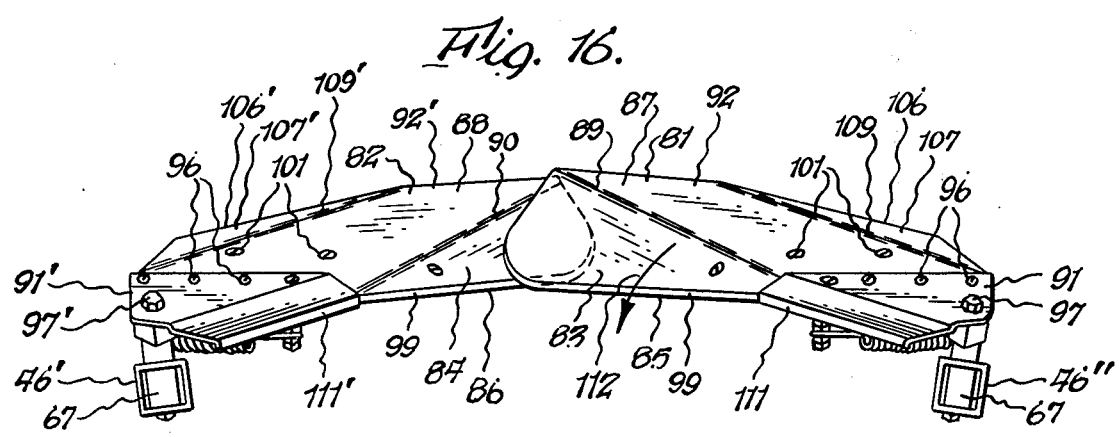
FIG. 16 is a front elevational view taken substantially along line 16—16 of FIG. 15.

In FIGS. 15–21 a preferred collector leaf assembly 80 is shown. The leaves 32 and 33 are identical to leaves designated by the same numerals and described above relative to FIGS. 2 and 4. Leaves 32 are mounted on pivot pin structures 59 which are identical to pivot pin structures 59 described above and shown in FIG. 4. Pivot pin structures 59 are mounted on box section 46' which is identical to the box section 46' shown in FIGS. 4–6. A mirror image box structure 46' is shown in relationship to box structure 46' for mounting leaves 33. Pivot pin structures such as 59 mount leaves 33.

The difference between the collector leaf assembly of FIGS. 15–21 and that shown previously, for example, in FIG. 2 resides in the construction of the lifting collector leaves 81 and 82. Leaves 81 and 82 are essentially mirror image counterparts of each other. The only other difference between leaves 81 and 82 is that leaf 81 has a downwardly and forwardly inclined planar portion 83 which is larger than portion 84 of leaf 82 so that, notwithstanding that leaf 81 overlaps leaf 82, the leading edges 85 and 86, respectively, will be approximately at the same elevation. Portions 83 and 84 are disposed downwardly at a steeper angle to the horizontal than the surfaces of leaves 32.

The downwardly and forwardly inclined planar portions 83 and 84 merge with planar portions 87 and 88, respectively, along lines 89 and 90, respectively, so that grapes which are lifted upwardly by portions 83 and 84 will pass over portions 87 and 88, respectively, and thence onto collector leaves 32 and 33.

Since the leaves 81 and 82 are essentially mirror image counterparts except for lifting portions 83 and 84, as described above, the following description will be directed primarily to leaf 81 and corresponding primed numerals will be applied to leaf 82 to designate counterpart structure.

Leaf 81 includes an inboard portion 91 and an outboard portion 92 connected by a hinge 93. In this respect, hinge 93 includes leaves 94 and 95 connected to leaf portions 92 and 91, respectively, by nut and bolt assemblies 96. The hinge structure 93 is such as to permit outboard portion 92 to rise between the solid and dotted line positions of FIGS. 15 and 20, as will appear more fully hereafter.

At this point it is to be noted that inboard portion 91 carries mounting pin 97 and inboard counterpart portion 91' carries an identical mounting pin 97'. Pins 97 and 97' each fit into an associated cylindrical housing 67, such as shown in FIG. 9. Housing 67 is welded to box section 46' and receives pin 97', which may be identical to the pin 68 of FIG. 9 and may be received in an identical manner as shown in FIG. 9. Cylindrical housing 67 has an axis which is parallel to the axes of identical cylindical housings 67a associated with pivoting constructions 59 of leaves 32. By virtue of this arrangement, lifting collector leaves, such as 81 and 82, may be installed on existing grape harvesters by merely removing the foremost collector leaves and replacing them with leaves 81 and 82.

The leading edge 85 of outboard portion 92 has a cylindrical rod 99 welded thereto so as to provide rigidity and a blunt edge which will not damage the vines. A cam 100 is secured to the underside of outboard portion 92 by means of screws 101 which extend through surfaces 83 and 87 and are received in cam 100. As can be seen from FIG. 18, cam 100 includes a relative thin portion 102 and a relatively thick portion 103 which define a camming surface 104. The portion of camming surface 104 normally rests on the enlarged rim portion 105 of collector leaf 33. When a post is encountered which swings leaf 81 from the solid line positions shown in FIGS. 15 and 18 to the dotted line positions shown therein, cam surface 104 will ride across rim portion 105 and outboard portion 92 will be lifted so that the downwardly inclined portion 83 of this leaf will rise over adjacent collector leaf 33. This is possible because of the action of hinge 93. Regardless of the relative positions of leaf 81 and its adjacent leaf 33, cam 100 will always insure that there will be no interference between the leaves. In other words, the geometry is such that the lifting portion 83 of leaf 81 can never engage leaf 33 because cam 100 will prevent this.

To insure that the trailing edge 106 of leaf 81 cannot pass below the leading portion 105 of leaf 33, the trailing portion 107 is bent upwardly along line 109. In this respect, uplifted trailing portion 107 cannot ride under adjacent leaf 33 when leaf 81 is in its full counterclockwise position and adjacent leaf 33 is in its full clockwise position.

As noted above, the foregoing description has been primarily directed to lifting collector leaf 81, and, as also noted above, it will be understood that counterpart structure on leaf 82 is designated by primed numerals corresponding to the unprimed numerals on collector leaf 81.

Furthermore, the mode of operation of leaf 82 is analogous to the mode of operation of leaf 81. The only difference is that leaf 81 pivots in a clockwise direction from its solid line position in FIG. 15 whereas leaf 82 pivots in a counterclockwise direction from its solid line position in FIG. 15.

At this point it is to be noted from FIG. 20 that rod 99 terminates at end 110 which bears against the flange 111 on inboard portion 91. This essentially acts as a stop to prevent excessive downward movement of outboard portion 92 in the direction of arrow 112 in FIG. 16. In other words, it helps to limit the pivotal movement of outboard portion 92 downwardly, but as can be visualized from FIG. 20, this in no way impedes the pivotal movement of outboard portion 92 upwardly when cam 100 is performing its intended function.

One advantage of the use of all of the lifting collector leaves of the present invention is that they will permit the normal collector leaves 32 and 33 to be inclined at a steeper angle than heretofore possible while still harvesting grapes from a lower elevation. The steeper inclining prevents the pile-up of grapes on the collector leaves 32 and 33 which could impede efficient harvesting.

It will be appreciated that the disclosed construction of the present invention may be applicable to other types of harvesters in addition to grape harvesters.

It can thus be seen that the harvester of the present invention mounting the improved collector leaf construction is manifestly capable of achieving the above enumerated objects and while preferred embodiments have been disclosed, it will be appreciated that the present invention is not limited thereto but may be otherwise embodied within the scope of the following claims.

What is claimed is:

1. A harvester for harvesting produce from plants such as grapevines or the like comprising a frame, produce harvesting means on said frame, collector leaf means on said frame, a surface on said collector leaf means for catching produce harvested from said plants by said harvesting means, and produce-lifting leaf means including a second surface located forwardly of said collector leaf means and below said surface of said collector leaf means, said second surface being disposed forwardly at a steeper angle to the horizontal than the surface of said collector leaf means for lifting produce which would normally pass below said surface up onto said surface.

2. A harvester as set forth in claim 1 wherein said produce-lifting leaf means comprises a leaf member, and pivot means mounting said lifting leaf member on said frame for permitting said lifting leaf member to pivot when it encounters an obstruction.

3. A harvester as set forth in claim 2 including means for mounting said lifting leaf member and said collector leaf means relative to each other so that said lifting leaf member can pivot without being impeded by said collector leaf means.

4. A harvester as set forth in claim 3 wherein said lifting leaf member includes a rear portion in overlying relationship to said collector leaf means, said second surface being downwardly inclined relative to said rear portion.

5. A harvester as set forth in claim 1 wherein said produce-lifting leaf means comprises first and second adjacent lifting leaf members each of which have one of said second surfaces.

6. A harvester as set forth in claim 5 wherein said first lifting leaf member overlaps said second lifting leaf member and includes a cupped portion in its second surface.

7. A harvester as set forth in claim 1 wherein said collector leaf means comprises a plurality of collector leaves, first pivot means mounting each of said collector leaves for pivotal movement about axes which are substantially parallel to each other, and second pivot means for mounting said produce-lifting leaf means for pivotal movement about an axis which will cause said second surface to rise above an adjacent collector leaf.

8. A harvester as set forth in claim 1 wherein said collector leaf means comprises a plurality of first collector leaves and a plurality of second collector leaves located in side-by-side relationship to said first collector leaves, first frame means and second frame means mounting said first and second collector leaves, respectively, and wherein said produce-lifting leaf means comprise downwardly inclined first and second portions on said first and second frame means for mounting certain of said collector leaf means for causing said certain of said collector leaf means to comprise said produce-lifting leaf means.

9. A lifting collector leaf for a harvesting machine comprising a rear portion, a front portion connected to said rear portion and extend forwardly and downwardly therefrom at an angle to said rear portion, and mounting means for mounting said lifting collector leaf on a harvesting machine.

10. A lifting collector leaf as set forth in claim 9 wherein said mounting means comprises means for pivotally mounting said lifting collector leaf on a harvesting machine.

11. A lifting collector leaf as set forth in claim 10 wherein said rear portion is substantially planar.

12. A lifting collector leaf as set forth in claim 11 wherein said front portion is substantially planar.

13. A lifting collector leaf as set forth in claim 11 wherein said front portion is concave upwardly.

14. A lifting collector leaf as set forth in claim 11 wherein said front portion is cupped upwardly.

15. A lifting collector leaf as set forth in claim 9 wherein said collector leaf includes an inboard portion and an outboard portion, hinge means joining said inboard and outboard portions, and wherein said mounting means is located on said inboard portion.

16. A lifting collector leaf as set forth in claim 15 wherein said first and second portions are substantially planar.

17. A lifting collector leaf as set forth in claim 15 including cam means on said outboard portion.

18. A lifting collector leaf as set forth in claim 17 wherein said cam means comprises a cam member secured to the underside of said outboard portion.

19. A lifting collector leaf as set forth in claim 18 wherein said cam member extends substantially parallel to said hinge means.

20. A lifting collector leaf as set forth in claim 16 including an upwardly inclined trailing edge on said rear portion.

21. A harvester for harvesting produce from plants such as grapevines or the like comprising a frame, produce harvesting means on said frame, collector leaf means on said frame, a surface on said collector leaf means for catching produce harvested from said plants by said harvesting means, produce-lifting leaf means below said surface for lifting produce which would normally pass below said surface up onto said surface, said produce-lifting leaf means comprising a lifting leaf member having a forward surface which is downwardly inclined relative to said collector leaf means and a rear surface which is oriented in overlying relationship to adjacent collector leaf means, first and second portions on said lifting leaf member, pivot means for pivotally mounting said first portion of said lifting leaf member on said frame for pivotal movement about a first axis, and hinge means joining said first and second portions, said hinge means providing a second axis which is offset from said first axis to permit said second portion of said leaf member to be raised over said adjacent collector leaf means as said lifting leaf member pivots.

22. A harvester as set forth in claim 21 including raising means for raising said second portion as said lifting leaf member pivots.

23. A harvester as set forth in claim 22 wherein said raising means comprises cam means on said second portion.

24. A harvester as set forth in claim 23 wherein said cam means are on the underside of said second portion for engagement with said adjacent collector leaf means.

25. A harvester for harvesting produce from plants such as grapevines or the like comprising a frame, produce harvesting means on said frame, collector leaf means on said frame, a surface on said collector leaf means for catching produce harvested from said plants by said harvesting means, produce-lifting leaf means below said surface for lifting produce which would normally pass below said surface up onto said surface, said produce-lifting leaf means comprising first and second adjacent lifting leaf members having surfaces which are forwardly and downwardly inclined relative to said collector leaf means, inboard and outboard portions on each of said lifting leaf members, pivot means for pivotally mounting said inboard portions on said frame for pivotal movement about first axes, and hinge means joining said inboard and outboard portions, said hinge means providing second axes which are offset from said first axes to permit said outboard portions to be raised over adjacent collector leaf means as said lifting leaf members pivot.

26. A harvester as set forth in claim 25 including raising means on said first and second adjacent lifting leaf members.

27. A harvester as set forth in claim 26 wherein said raising means comprises cam means on said outboard portions.

28. A harvester as set forth in claim 27 wherein said cam means are on the undersides of said outboard portions for engagement with said adjacent collector leaf means.

29. A harvester for harvesting produce from plants such as grapevines or the like comprising a frame, produce harvesting means on said frame, collector frame means on said frame, a surface on said collector leaf means for catching produce harvested from said plants by said harvesting means, produce-lifting leaf means below said surface for lifting produce which would normally pass below said surface up onto said surface, said produce-lifting leaf means comprising a lifting leaf member having a forward portion which is forwardly and downwardly inclined relative to said surface of said collector leaf means and which extends below said surface of said collector leaf means, pivot means mounting said lifting leaf member on said frame for permitting said lifting leaf member to pivot when it encounters an obstruction, said collector leaf means comprising a plurality of collector leaves each having a front portion and a rear portion, means pivotally mounting said collector leaves adjacent to each other on said frame with the rear of certain of said collector leaves overlapping the front of the immediately adjacent collector leaves, and wherein said lifting leaf member includes a front portion and a rear portion, and means mounting said lifting leaf member on said frame with its rear portion overlapping the front portion of an adjacent collector leaf, and clearance means for causing said forwardly and downwardly inclined portion of said lifting leaf member to clear said surface of said collector leaf adjacent thereto when said lifting leaf member is caused to pivot by engaging an obstruction.

30. A harvester as set forth in claim 29 wherein said clearance means comprises first pivot means mounting said collector leaf means adjacent to said lifting leaf member at a first angle to said frame, and second pivot means for mounting said lifting lef member at a second angle to said frame to cause said lifting leaf member to rise at a steeper angle than said collector leaf when it is deflected.

31. A harvester as set forth in claim 29 wherein said lifting leaf member includes an inboard portion and an outboard portion hinged to said inboard portion, and wherein said mounting means comprises pivot means mounting said inboard portion on said frame, and wherein said clearance means comprises cam means mounted on said outboard portion for guiding said outboard portion over the portion of said collector leaf means adjacent thereto.

32. A harvester for harvesting produce from plants such as grapevines or the like comprising a frame, produce harvesting means on said frame, collector leaf means on said frame, a surface on said collector leaf means for catching produce harvested from said plants by said harvesting means, produce-lifting leaf means below said surface for lifting produce which would normally pass below said surface up onto said surface, said collector leaf means comprising a plurality of first aligned collector leaves and a plurality of second aligned collector leaves located in side-by-side relationship to said first collector leaves, first and second frame means mounting said first and second collector leaves, respectively, and wherein said produce-lifting leaf means comprises first and second lifting leaf members in alignment with said plurality of first and second collector leaves, respectively, and located forwardly of said first and second collector leaves, each of said first and second lifting leaf members including front and rear portions with said front portions being downwardly inclined relative to said rear portions, so as to lift produce up onto said rear portions.

33. A harvester as set forth in claim 32 including first and second pivot means for pivotally mounting said first and second collector leaves on said first and second frame means, respectively, third and fourth pivot means for mounting said first and second lifting leaf members on said first and second frame means, respectively, said collector leaves having leading and trailing portions with the trailing portions of certain collector leaves overlapping the leading portions of adjacent collector leaves, and said rear portions of said lifting leaf members overlapping the leading portions of adjacent collector leaves whereby said front portions of said lifting leaf members lift produce onto said first and second collector leaves.

34. A harvester as set forth in claim 33 wherein said first and second lifting leaf members each include an inboard portion and an outboard portion, and hinge means for pivotally mounting said outboard portions on said inboard portions for upward pivotal movement.

35. A harvester as set forth in claim 34 including raising means for raising said outboard portions of said first and second lifting leaf members over said front portions of said adjacent first and second collector leaves, respectively, as said first and second lifting leaf members pivot rearwardly about said third and fourth pivot means, respectively, to thereby permit said front portions to clear said first and second collector leaves.

36. A harvester as set forth in claim 35 wherein said raising means comprise first and second cam means affixed to the undersides of said outboard portions of said first and second lifting leaf members, respectively.

* * * * *